H. D. Forbes,
Insect Trap,
No. 78,950. Patented June 16, 1868.

Witnesses:

Inventor:

United States Patent Office.

HENRY D. FORBES, OF CAMBRIDGE, MASSACHUSETTS.

Letters Patent No. 78,950, dated June 16, 1868.

IMPROVED MOSQUITO-KILLER.

The Schedule referred to in these Letters Patent and making part of the same.

TO ALL WHOM IT MAY CONCERN:

Be it known that I, HENRY D. FORBES, of Cambridge, in the county of Middlesex, and State of Massachusetts, have invented certain new and useful Improvements in Mosquito-Killers; and I do hereby declare that the following is a full and exact description thereof, reference being had to the accompanying drawings, and to the letters of reference marked thereon.

The nature of my invention consists in making, as a new article of manufacture, a mosquito-killer, consisting of a head-piece, made of a thin board, covered with cloth of a loose nap, and in connecting the same to a handle by means of a flexible joint.

To enable others skilled in the art to make and use my invention, I will proceed to describe its construction and use.

In the drawings—

I construct my mosquito-killer as follows:

F is a flat board, covered with some soft long-napped material, like cotton flannel or ordinary blanketing.

E is a socket-piece, made of wood or metal.

D is a piece of flexible rubber, one end of which is made fast to E, and the other end is made fast to the upper end of the handle C.

Figure 1:
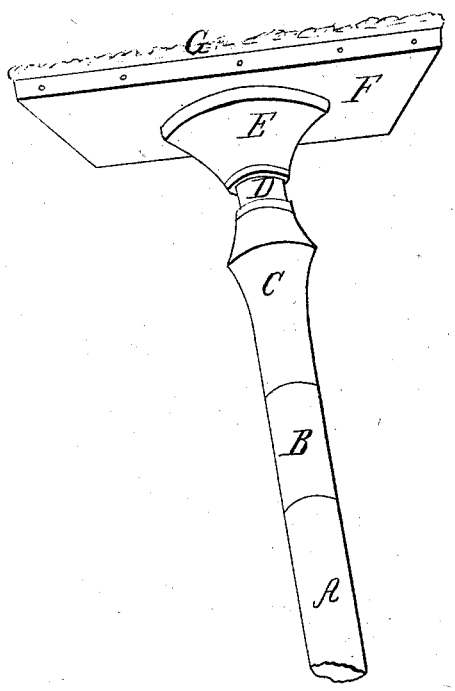
Figure 1 is a perspective view of my mosquito-killer.
Figure 2:
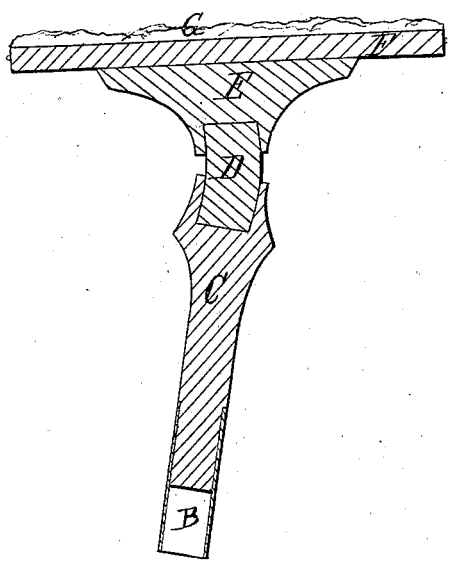
Figure 2 is a vertical section of the same.

C is a short handle, to the end of which is attached a ferrule, B, so that, if desired, a longer handle, A, fig. 1, may be attached.

The piece D being flexible, and yet of sufficient stiffness to hold the head-piece steadily, there is no trouble in bringing the upper surface, G, flatly and with great rapidity on to the wall, so that there is but little chance for the mosquito or other insects to escape. Instead of making D of rubber, any suitable material may be used.

The object of having the upper surface soft, and with long nap, is, that the insect to be killed may not be crushed, and thus disfigure the wall.

By having a long handle to this instrument, mosquitoes may be killed upon any part of the wall or ceiling, and with very little trouble to the person using it.

Having thus described my invention, I will now proceed to set forth my claim.

What I claim as my invention, and desire to secure by Letters Patent, is—

A mosquito-killer, having a head-block, F, flexible joint D, and handle C, substantially as described, and for the purpose set forth.

HENRY D. FORBES.

Witnesses:
FRANK G. PARKER,
A. HUN BERRY.